Aug 5, 1941.  G. L. KNOX  2,251,360

DUAL AXLE SUSPENSION SYSTEM

Filed Jan. 17, 1940

Inventor.
Garner L. Knox.

Attorneys.

Patented Aug. 5, 1941

2,251,360

UNITED STATES PATENT OFFICE 2,251,360

DUAL AXLE SUSPENSION SYSTEM

Garner L. Knox, Glendale, Calif., assignor to Utility Trailer Manufacturing Company, Los Angeles, Calif., a corporation of California Application January 17, 1940, Serial No. 314,216

7 Claims. (Cl. 280—124)

This invention relates to dual axle suspension systems and is applicable generally to vehicles of all types. Dual axle suspensions are most commonly used on heavy duty trucks and the like, and I explain my invention in the form in which it has been specifically designed for such use, but the invention is not to be limited thereto.

The general object of the invention is to provide a simple, rugged and durable suspension system by which dual axles are suspended in such a manner as to allow the greatest possible relative freedom and flexibility between the axles of a pair, and at the same time to provide for equable distribution of the load to both axles under all operating conditions.

The invention may be described briefly as embodying a set of two levers, one relatively long and the other relatively short, mounted on a central pivot or pivots on some part of the frame of the vehicle. This central pivot may be and preferably is a common or concentric pivot, and the two levers are thus concentrically pivotally mounted. The suspension springs are typically in the form of the usual leaf spring; and they are mounted with their ends connected between adjacent ends of the long and short levers.

The whole assembly is one which is symmetric about the central pivot or pivots, and any substantial vertical displacement of either axle in one direction tends to vertically displace the connected axle in the opposite direction by an equal amount. Or, putting the matter another way, displacement of either axle is resisted by the resistance to opposite displacement exerted by the other axle and its interconnected spring. The result is that, under all conditions of operation, the total load is equably divided between the two sets of springs and the two axles.

Figure 1:
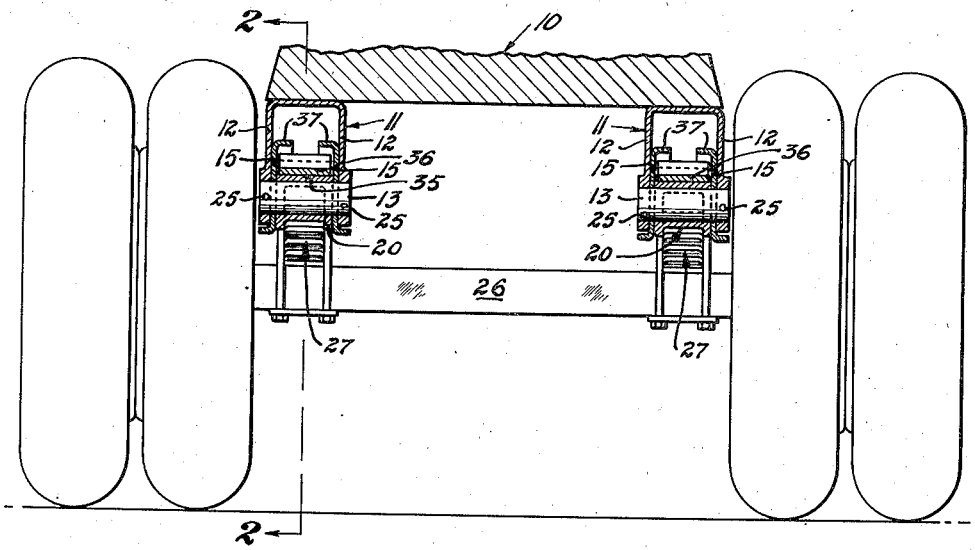
Figure 2:
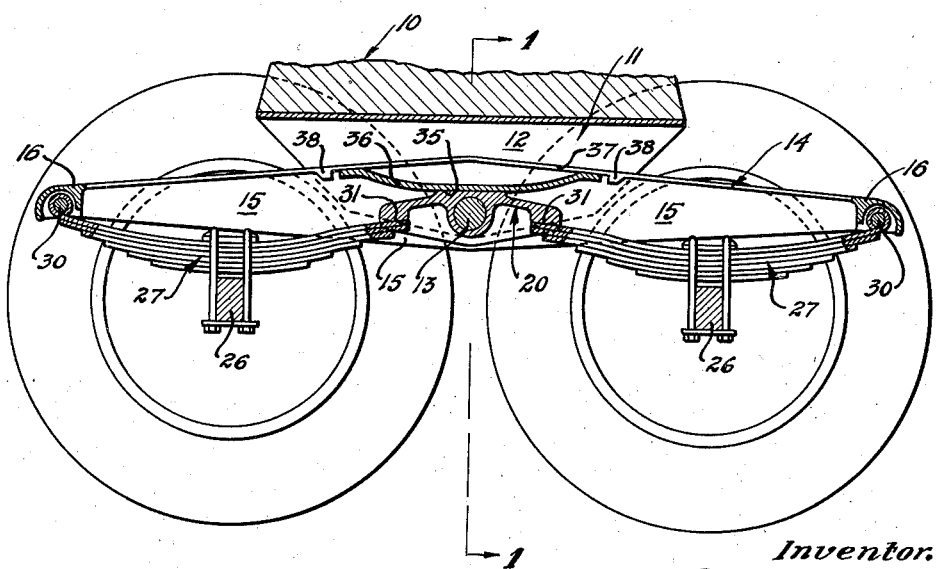

In the following description I set out a particular illustrative form of the invention, reference for this purpose being had to the accompanying drawing, in which Fig. 1 is a transverse vertical section illustrating my invention, and taken as indicated by line 1—1 on Fig. 2, and Fig. 2 is a longitudinal vertical section taken as indicated by line 2—2 on Fig. 1.

In the drawing a vehicle body is diagrammatically indicated at 10, and at 11 I show a pair of mounting brackets which, for the purpose of my invention, may be considered as a part of the vehicle frame or body and which therefore may be of any type or design, or may be a body or frame part which performs functions other than that of a mere mounting bracket. As shown in the drawing these mounting brackets 11 are designed with two depending side flanges 12 which carry between them the pivot pins 13. Mounted on each pivot pin 13 is a long lever 14 which, in the specific design here illustrated, is made up of two longitudinally extending side members 15 interconnected by suitable end structures 16 at their ends. The two side members 15 of the long levers 14 are pivotally mounted on the pivot pins 13, being spaced apart such a distance that their outer faces lie substantially against the inner faces of the bracket flanges 12.

The relatively short levers 20 are centrally mounted upon the same pivot pins 13 and are located transversely between the side members 15 of the long levers, as is clearly shown in Fig. 1. The width of short levers 20 is such as to snugly fit in the space between side members 15, so that although both levers of a set have sufficient freedom to swing on their pivot, both levers are restricted against any substantial amount of lateral play or looseness along the axis of pin 13. And to prevent the bracket flanges 12 from being spread apart by forces exerted longitudinally of the axles, transversely of the truck, the ends of pin 13 may be secured in the bracket flanges 12 by any suitable means, such as by transverse pins 25, or by welding or the like.

As in all dual axle systems, the two wheel axles 26 are spaced apart longitudinally of the vehicle. At each end of each axle a leaf spring 27 is mounted upon the axle. In my system of suspension the outer end of each spring bears upwardly against an outer end of the corresponding long lever 14 while the inner end of each spring bears upwardly against an outer end of the corresponding short lever 20. In the preferred design here shown, the outer end of each spring is connected at the pin 30 with the corresponding outer end of lever 14, while the inner end of each spring, lying between the two side members 15 of the long lever 14, merely presses upwardly against a suitable bearing face 31 at the corresponding end of short lever 20.

I provide means for maintaining the long and short levers of each set normally in parallel relation, which normal relation is shown in Fig. 2. I provide the short lever with a central flat upper face 35, such as shown in Fig. 2; and a light leaf spring 36 bears down centrally on this face 35 and has its two ends bearing upwardly against the inturned upper flanges 37 of the long lever side members 15. Lugs 38, or any other suitable means, prevent spring 36 from any substantial movement longitudinally out of its proper position, at the same time allowing sufficient freedom for the spring ends to move toward and away from each other in action. The central part of this leaf spring 36 may be flat so as to flatly engage the surface 35 on the short lever.

It will be understood that the suspensions at each side of the vehicle—at each of the opposite ends of the axles—are identic. Freedom for independent action of each of the two laterally spaced suspensions is allowed by torsional actions of the springs 27 or by the fact that they are not necessarily rigidly attached to the levers.

The strength of leaf spring 36 is such as to tend to hold short lever 20 in its normal position relative to long lever 14, as long as the two axles remain parallel to each other; that is, as long as the parallelogram formed by the axles and the two suspensions remains undistorted. This is the case, for instance, when the two ends of one axle move up or down together. Under such conditions the leverage system acts more or less as if short levers 20 were rigidly affixed to long levers 14; or as if the inner ends of springs 27 bore directly on the long levers 14. Under conditions of relative vertical displacement of one end of one axle, moving the axles out of parallelism, the short lever 20 will be displaced about pivot 13 relative to long lever 14. Thus, suppose that one end of the right-hand axle, say the end shown in Fig. 2, is forced upwardly, the other end remaining in normal position. The right hand end of long lever 14 will be moved upwardly by pressure of the right hand spring 27; but the right hand end of short lever 20 will, under such conditions, be moved up through a greater angle of elevation than is the right hand end of long lever 14, the short lever 20 thus moving out of parallelism with the long lever. When said end of the right hand axle moves up, its spring 27 tends to twist that end of that axle through an angle equal to the angle of elevation of long lever 14. But the spring 27 at the opposite end of that axle opposes that angular displacement of the axle; with the result that the whole axle is angularly displaced (twisted) through an angle about half the amount it would be if both ends of that axle moved up equally. The result is a relative angular displacement of that axle relative to both long levers. As a consequence the right hand end of the short lever (in this illustrative action—the short lever shown in Fig. 2) will be raised relative to its long lever. (The opposite relative motion of the short lever at the other side of the suspension will take place). By this action the left hand end of short lever 20, of Fig. 2, is depressed relative to the left hand end of long lever 14, with the result that the left hand spring 27 is relatively depressed (or tends to be relatively depressed) more than it otherwise would be. The action just explained is a reversible one. If for instance the illustrated end of the left hand axle 26 in Fig. 2 drops, the release of stress in the left hand spring 27 will allow the left hand end of short lever 20 to be pressed down, relatively to long lever 14, by the upward pressure of the right hand spring 27 on the right hand end of the short lever.

I have spoken of the members 27 as springs, and normally they will be such. But beams of any type, even rigid, may be used in my system instead of the spring beams, illustrated, and the system will operate as described to keep the load equally distributed. It is only necessary that the points of articulate connection of each axle end with the lever ends, such as illustrated here by the points 30 and 31, be more or less longitudinally separated. A greater or lesser separation will modify the extent of the actions described, but not their nature.

In practice I find that the strength and the force exerted by spring 36 need be only enough to restore levers 20 to normal position when the axles return to parallelism. It is only the frictions involved in the system that spring 36 has to overcome.

I claim:

1. In a suspension system for two transversely extending and longitudinally spaced axles in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing freely vertically, a relatively short rigid lever pivoted between its ends to swing vertically, the outer ends of the respective suspension springs being connected to the ends of the long lever and the adjacent ends of said suspension springs being connected to the ends of the short lever; and yielding means tending to hold the two levers of each set in a predetermined angular relation.

2. In a suspension system for two transversely extending and longitudinally spaced axles in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing freely vertically, a relatively short rigid lever pivoted between its ends to swing vertically, the outer ends of the respective suspension springs being connected to the ends of the long lever and the adjacent ends of said suspension springs being connected to the ends of the short lever; and yielding means tending to hold the two levers of each set in parallelism.

3. In a suspension system for two transversely extending and longitudinally spaced axles in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing vertically, a relatively short rigid lever pivoted between its ends coaxially with the pivot of the long lever to swing freely vertically, the outer ends of the respective suspension springs being connected to the ends of the long lever and the adjacent ends of said suspension springs being connected to the ends of the short lever; and yielding means tending to hold the two levers of each set in a predetermined angular relation.

4. In a suspension system for two transversely extending and longitudinally spaced axles in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing freely vertically, a relatively short rigid lever pivoted between its ends coaxially with the pivot of the long lever to swing vertically, the outer ends of the respective suspension springs being connected to the ends of the long lever and the adjacent ends of said suspension springs being connected to the ends of the short lever; and yielding means tending to hold the two levers of each set in parallelism.

5. In a suspension system for two transversely extending and longitudinally spaced axles in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing freely vertically, a relatively short rigid lever pivoted between its ends to swing vertically, the outer ends of the respective suspension springs being connected to the ends of the long lever and the adjacent ends of said suspension springs being connected to the ends of the short lever; and a spring acting between the two levers of each set and tending to hold the two levers in a predetermined relation.

6. In a suspension system for two transversely extending and longitudinally spaced axles, in association with a vehicle frame, each axle carrying at each end a longitudinally extending suspension spring, with the adjacent ends of the two springs at the corresponding ends of the axles spaced apart longitudinally; two sets of longitudinal suspension levers, each set comprising a relatively long rigid lever pivoted between its ends to the vehicle frame to swing freely vertically, a relatively short rigid lever pivoted between its ends to swing vertically, the outer ends of the respective suspension springs being connected to the ends of the long lever and the adjacent ends of said suspension springs being connected to the ends of the short lever; and a spring acting between the two levers of each set and tending to hold the two levers in parallelism.

7. In a suspension system for two transversely extending and longitudinally spaced axles in association with a vehicle frame, each axle carrying at each end a longitudinally extending suspension beam, with the adjacent ends of the two beams at the corresponding ends of the axles spaced apart longitudinally; two sets of longitudinal suspension levers, each set comprising a relatively long lever pivoted between its ends to the vehicle frame to swing vertically, a relatively short lever pivoted between its ends coaxially with the pivot of the long lever to swing vertically, the outer ends of the respective suspension beams being connected to the ends of the long lever and the adjacent ends of said suspension beams being connected to the ends of the short lever; and yielding means tending to hold the two levers of each set in parallelism, said means comprising a leaf spring bearing at its ends on the long lever and bearing slidably at its medial portion on a relatively flat medial surface on the short lever.

GARNER L. KNOX.